UNITED STATES PATENT OFFICE 2,077,229

PROCESSES FOR BREAKING PETROLEUM EMULSIONS

Melvin De Groote, St. Louis, and Arthur F. Wirtel, Kirkwood, Mo., assignors to Tretolite Company, Webster Groves, Mo., a corporation of Missouri No Drawing. Application September 18, 1936, Serial No. 101,437

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an alkylated naphthalene sulfonic acid body in the form of a substituted amine salt of the kind hereinafter described. The substituted amine is of the kind obtained by reaction between an amine of the formula $H_mX_nN$, in which $m$ represents the numeral one or two, $n$ represents the numeral one or two, and $m$ plus $n$ are equal to three; and in which X is an alkyl residue, a cyclohexyl residue, or an aralkyl residue, and a mono- or di-chlorhydrin derived from glycerol, a glycerol ether, a glycol, a glycol ether, or the appropriate functional derivatives which would act in the same manner. Such equivalents include ethylene oxide, higher alkylene oxides, glycidol, etc.

The said demulsifying agent is further characterized by the fact that at least one of the alkyl groups substituted in the naphthalene nucleus contains not less than three carbon atoms and not more than ten carbon atoms. Such products are nuclear substituted products.

Commercial demulsifying agents employed for breaking or resolving oil field emulsions include, among other substances, substituted polycyclic aromatic sulfonic acids, or their salts. The type which finds most frequent application is obtained by introducing one, two or more alkyl groups into a naphthalene residue and then producing the sulfonic acid, or by introducing alkyl groups into the sulfonic acids. Due to the corrosiveness of the sulfonic acid, it is the usual practice to employ the reagent in the form of a salt, such as ammonium salt, potassium salt, sodium salt, etc.

We have found that if the alkylated aromatic sulfonic acids of the kind previously referred to are neutralized by a substituted amine of the kind previously referred to and hereinafter described in greater detail, one obtains a treating agent or a demulsifying agent of unusual effectiveness. In order that the composition of the substituted amines will be more fully understood, their method of preparation or chemical formulas will be described.

In our co-pending application for patent Serial No. 101,433, filed Sept. 18, 1936, we have described a process for breaking petroleum emulsions of the water-in-oil type which consists in subjecting the emulsion to the action of a demulsifying agent comprising an alkylamino propanol salt of an alkylated naphthalene sulfonic acid in which at least one alkyl group substituted in the naphthalene nucleus contains at least three carbon atoms and not more than ten carbon atoms. Substituted alkylamines or substituted alkylamino propanols of the kind which are employed to neutralize the alkylated naphthalene sulfonic acids so as to produce the material employed as the demulsifying agent in the process described in the aforementioned co-pending application for Letters Patent, include the following:

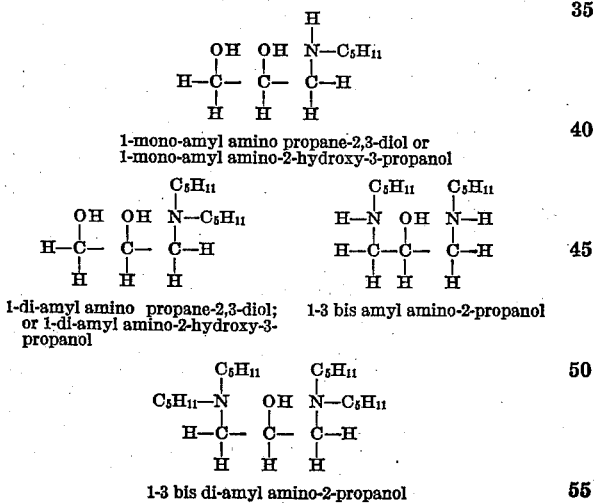

1-mono-amyl amino propane-2,3-diol or
1-mono-amyl amino-2-hydroxy-3-propanol 1-di-amyl amino propane-2,3-diol;
or 1-di-amyl amino-2-hydroxy-3-propanol 1-3 bis amyl amino-2-propanol 1-3 bis di-amyl amino-2-propanol In order that the method of manufacture of such materials may be understood, reference is made to U. S. Letters Patent No. 2,042,621, dated June 2, 1936, to Olin. This particular patent teaches the production of certain new compositions of matter which are basic in character and which combine with acids such as alkylated naphthalene sulfonic acids, to produce salts. The new compositions of matter there described are formed by reaction of mono- and di-amylamines with glycerol mono- and di-chlorhydrins, namely, 1-mono- and di-amyl amino propane-diols and bis mono- and di-amyl amino propanols. These compounds may be considered as derivatives of glycerol having one or more hydroxyl radicals replaced by mono- or di-amyl amino radicals. It is apparent that these products are characterized by the fact that the total number of residual hydroxyl radicals plus the total number of substituent amino radicals are always equal to three.

Two molecules of glycerol mono-chlorhydrin can be reacted with one molecule of mono-amylamine to yield a product of the following type:

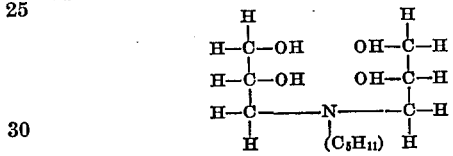

Such a product may be employed very advantageously for neutralization of alkylated polycyclic sulfonic acids employed in the manufacture of the material used as the demulsifying agent in the present process.

In the illustration referred to previously reference has been made to mono-amylamine and di-amylamine, since this alkylamine is available in the open market at the lowest price. Any other suitable alkylamine, and particularly alkylamines having at least four and not more than eight carbon atoms, are equally suitable. It is known, of course, that the various primary and secondary amines may occur in more than one isomeric form. For instance, the expression "alkylamine" is not intended to differentiate betwen isomeric forms, as, for example, amylamine where the alkyl group may have a straight chain form or a branched chain form. The most suitable amines are those having at least four and not more than eight carbon atoms. Primary and secondary butylamine, amylamine, hexylamine, heptylamine, and octylamine appear to be the most satisfactory amines for reaction with the glycerol chlorhydrins. Cetylamine may also be used. Also suitable alkylamines are described in Thorpe Dictionary of Applied Chemistry, vol. 1, p. 188 (1921).

Piperidine (hexahydro-pyridine) is not a true aliphatic amine from the strictest structural standpoint, but is commonly recognized as having the properties of an aliphatic amine. Hence, it is intended that piperidine be included in the broad classification of alkylamines. Smith, A Textbook of Organic Chemistry, 1932, second edition, revised, p. 646, states as follows: "Whereas, pyridine is a weak tertiary base of aromatic character, piperidine is a strong secondary base, the entire behaviour of which classifies it with the aliphatic amines."

The production of reagents of the kind above described need not be restricted to glycerol chlorhydrins, but instead, said reagents may also be obtained from glycidol,

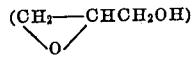

(See Journal of American Chemical Society, vol. 52, 1930, pp. 1521 and 1528).

The reactions there described are concerned with glycidol and secondary alkylamines, but the same reaction may be conducted with primary amines, or two molecules of glycidol may be reacted with one molecule of a primary alkylamine. The various di-alkyl hydroxy propanols described in said article, that is, the di-methyl, di-ethyl, di-normal propyl, di-isopropyl di-normal amyl, and the piperidine amino hydroxy propanols, or amino propane diols, may be employed to neutralize the alkylated naphthalene sulfonic acids so as to produce the reagent employed in the present process.

Not only can alkylated naphthalene sulfonic acids of the kind previously referred to be neutralized with products obtained by reaction between primary or secondary alkylamines and a glycerol chlorhydrin, but glycol chlorhydrins may be used just as advantageously. Reference is made to our co-pending application for Letters Patent Serial 101,434, dated Sept. 18, 1937, in which we describe a process for breaking petroleum emulsions of the water-in-oil type, which consists in subjecting the emulsion to the action of a demulsifying agent comprising a hydroxyalkyl-alkylamine salt of an alkylated naphthalene sulfonic acid, in which at least one alkyl group substituted in the naphthalene nucleus contains at least three carbon atoms and not more than ten carbon atoms.

Briefly stated, the process involved in the manufacture of these last mentioned reagents is substantially the same as the one referred to previously, except that glycol chlorhydrins are employed, instead of glycerol mono-chlorhydrins, and that alkylene oxides, such as ethylene oxide, may be used in place of the glycol chlorhydrin.

The reactions may be illustrated as follows:

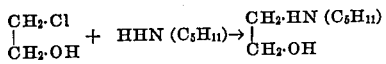

In the event that di-amylamine is employed, the resultant product would be:

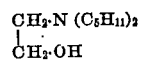

The products so obtained may be either hydroxyalkyl-mono-alkylamines, or hydroxyalkyl-di-alkylamines.

Not only may reactions of the kind above referred to be employed to produce products of the kind contemplated for production of the reagent used in the present process, but one may also produce reagents by the reactions involving an alkylene oxide and a suitable primary or secondary amine. Ethylene oxide may react with mono-amylamine, as indicated by the following reaction:

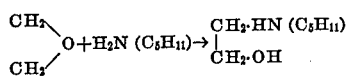

Similarly, when ethylene oxide is reacted with di-amylamine, the corresponding compound previously described, that is:

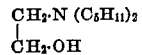

is formed. However, by either the reaction involving chlorhydrin, or by the reaction involving the alkylene oxide, two molecules of the oxide or the chlorhydrin can be united with one molecule of the primary amine, so as to give a dihydroxy di-ethyl mono-alkylamine, as indicated by the following reactions:

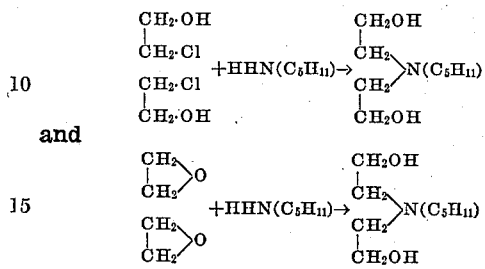

The chlorhydrins may be obtained from various glycols, such as ethylene glycol, propylene glycol, butylene glycol, amylene glycol, hexylene glycol, etc. Other glycols suitable for conversion into chlorhydrins include heptamethylene glycol, nonamethylene glycol, decamethylene glycol, undecamethylene glycol, tri-decamethylene glycol, tetradecamethylene glycol, and octadecamethylene glycol.

In our co-pending application for Letters Patent Serial No. 101,435 filed September 18, 1936, we have disclosed a process for breaking petroleum emulsions of the water-in-oil type, which consists in subjecting the emulsion to the action of a demulsifying agent comprising a polyhydric alcohol ether substituted alkylamine salt of an alkylated naphthalene sulfonic acid, in which at least one alkyl group substituted in the naphthalene nucleus contains at least three carbon atoms and not more than ten carbon atoms.

Not only may suitable amines be derived from the diol chlorhydrins or triol chlorhydrins, etc., but they may be obtained from similar bodies, such as glycerol ethers or glycol ethers. Reagents so produced are employed as demulsifying agents in the process referred to immediately above in the last mentioned pending application for Letters Patent Serial No. 101,435. Briefly stated, the preparation of the ether alcohol chlorhydrin is as follows: Glycerol is readily converted into di-glycerol, a glycerol ether which is used in the manufacture of certain kinds of dynamite. Glycerol may be converted into tri-glycerol, or even higher glycerols. Di-glycerol, for example, is suitably prepared in the manner described in U. S. Letters Patent No. 1,126,467, dated January 26, 1915, to Hibbert. The various glycol ethers can be prepared by the same process, or by other processes of the kind employed in the manufacture of polyglycerols. Di-glycerol is a commodity sold in the open market. Di-ethylene glycol is a commodity available in the open market.

If any suitable polyhydric alcohol ether containing two or more hydroxyl groups is converted into a chlorhydrin having at least one residual hydroxyl group, then such intermediate product is suitable for reaction with a primary or secondary alkylamine to give the final substituted alkylamine which is used to neutralize the alkylated sulfonic acids, so as to result in one of the demulsifying agents employed in the present process.

The method of manufacturing from mono-chlorhydrins or di-chlorhydrins from glycerol is well known. The preparation of glycerol chlorhydrin and glycerol di-chlorhydrin is described in Organic Syntheses, Collective Volume 1, Gilman, pp. 286 and 288. The same methods may be employed in the manufacture of chlorhydrins from the polyhydric alcohol ethers, except that for use in manufacturing the reagent of the present process, it is not necessary to go through the purification steps, insofar that a product containthe bulk of such chlorhydrins, for instance, 65-75%, may be used, if desired, in place of the purified product. The manufacture of chlorhydrins is equally satisfactory, regardless of whether the polyhydric alcohol ether was derived from a glycol or a glycerol, or from a glycerol and a glycol, or from a glycerol and a mono-hydric alcohol, or other possible combinations.

Having obtained a polyglycerol ether chlorhydrin, for example, containing at least one residual hydroxyl, the next step is reaction with the alkylamine, so as to produce the substituted alkylamine of the kind contemplated.

For purposes of illustration, the reactions will be illustrated by the use of di-glycerol, as an example, although it is understood that any of the various chlorhydrins of the kind specified without limitation as to any isomeric form, may be used.

Although di-glycerol may occur in three different isomeric forms, it may be illustrated by the following formula:

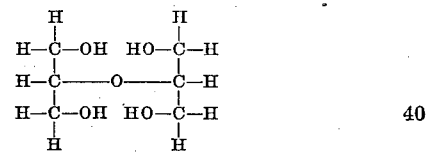

Such di-glycerol may be converted into either the mono-chlorhydrin or the di-chlorhydrin, in the same manner that glycerol is so converted. For purpose of illustration, the reaction involving the mono-chlorhydrin will be described. The mono-chlorhydrin has the following composition:

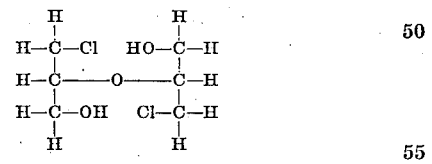

When such a product is reacted with mono-amylamine, or with di-amylamine, reaction takes place with the elimination of hydrogen chloride, which may combine with the unreacted amine or with the substituted amine. Since the hydrochloride is eliminated by subsequent reaction with strong caustic soda, it will be ignored and the reaction simply illustrated as follows:

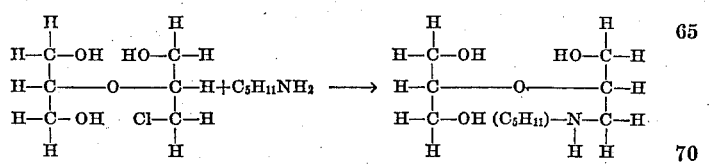

Similar reactions involve the substitution of di-amylamine for the mono-amylamine. Other reactions involve two molecules of mono-amylamine or two molecules of di-amylamine reacting with one molecule of the di-chlorhydrin, which may be illustrated by the following formula:

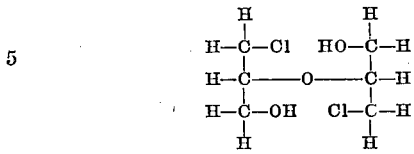

Some reactions may involve two molecules of the mono-chlorhydrin, and one molecule of the mono-amylamine, with the elimination of two hydrogen atoms from the mono-amylamine. If one were able to produce tri-chlorhydrins from glycerol ethers, such materials would be suitable for use and might produce a more complex compound of increased efficiency.

Since di-glycerol is available commercially and since ethylene glycol is available commercially, it is our preference to manufacture our reagents from these compounds as raw materials.

In the illustrations previously referred to, reference has been made to mono-amylamine and di-amylamine, since this alkylamine is available in the open market at the lowest price. Any of the various alkylamines may be employed, as described in the reactions involving glycerol chlorhydrins, etc.

In our co-pending application for Letters Patent Serial No. 101,436 filed Sept. 18, 1936, we have disclosed the use of a demulsifying agent obtained by reaction between chlorhydrins of the kind previously described or their appropriate functional equivalents, and phenyl alkylamines, such as benzylamine, phenyl ethylamine, etc.

The reaction between glycerol mono-chlorhydrin and benzylamine, for example, is illustrated as follows:

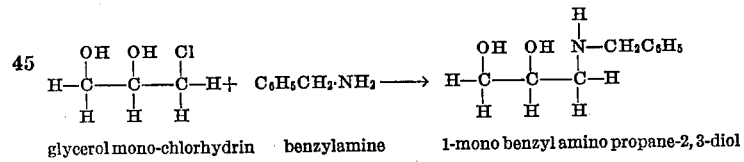

glycerol mono-chlorhydrin    benzylamine    1-mono benzyl amino propane-2,3-diol The reaction between glycerol di-chlorhydrin and benzylamine is illustrated as follows:

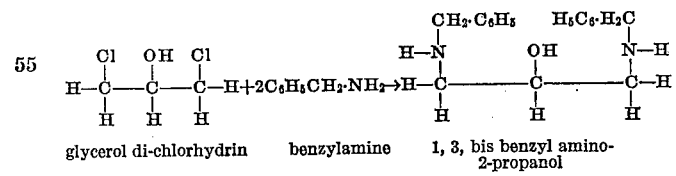

glycerol di-chlorhydrin    benzylamine    1, 3, bis benzyl amino-2-propanol

It is furthermore known that two molecules of glycerol mono-chlorhydrin can react with one molecule of benzylamine to give a bis-glycero-benzylamine. This reaction is illustrated as follows:

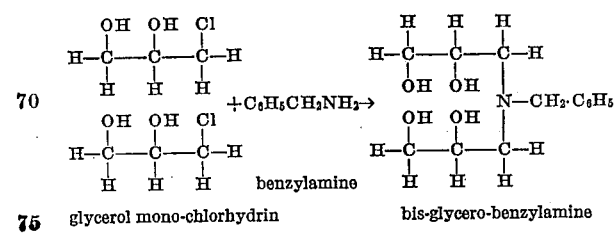

glycerol mono-chlorhydrin        bis-glycero-benzylamine

It may be desirable to point out that the liberation of hydrochloric acid may result in a combination with the amino to produce an amine chloride or an amine hydrochloride. For this reason, it is customary to treat the mass after reaction with sodium or potassium hydroxide until strongly alkaline, so as to liberate the free base.

As has been previously indicated, the same products may be obtained by reaction involving glycidol and benzylamine, as indicated below:

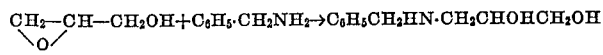

Similarly, two molecules of glycidol may react with one molecule of benzylamine.

The reaction of the kind described is not limited to a triol derivative, but may also be applied in connection with a diol derivative. For instance, ethylene chlorhydrin (glycol chlorhydrin) can be reacted with benzylamine, as indicated in the following reaction:

$$\begin{array}{l} CH_2Cl \\ | \\ CH_2 \cdot OH \end{array} + C_6H_5CH_2 \cdot NH_2 \rightarrow \begin{array}{l} CH_2 \cdot HN \cdot CH_2 \cdot C_6H_5 \\ | \\ CH_2 \cdot OH \end{array}$$

Similarly, the same product can be obtained involving ethylene oxide in the following manner:

$$\begin{array}{l} CH_2 \\ | \\ CH_2 \end{array}\!\!>\!O + C_6H_5CH_2 \cdot NH_2 \rightarrow \begin{array}{l} CH_2 \cdot HN \cdot CH_2 \cdot C_6H_5 \\ | \\ CH_2 \cdot OH \end{array}$$

Similar products may be obtained in which two molecules of ethylene chlorhydrin or ethylene oxide united with one molecule of benzylamine to give a product indicated by the following formula:

$$\begin{array}{l} CH_2 \cdot OH \\ | \\ CH_2 \\ \phantom{CH_2}\!\!>\!N \cdot CH_2 \cdot C_6H_5 \\ CH_2 \\ | \\ CH_2 \cdot OH \end{array}$$

Reactions between benzylamine and a glycol chlorhydrin or alkylene oxide are not limited to the ethylene derivative, but of course, may include various glycols of the kind previously mentioned, and also various alkylene oxides of the kind, such as propylene oxide, butylene oxide, amylene oxide, etc.

Similarly, the reactions may be conducted between benzylamine and the chlorhydrins derived from glycerol ethers or glycol ethers of the kind previously described. Any chloride or hydrochloride formed is decomposed by treatment with strong caustic soda or potash.

In the present process, we have found that the corresponding substituted cyclohexylamine salt or substituted alkyl cyclohexylamine salt, such as the ones derived from di-ethyl or di-methyl cyclohexylamine, yield a valuable demulsifying agent when employed to neutralize alkylated naphthalene sulfonic acids of the kind previously referred to. In other words, if cyclohexylamine or its alkylated derivatives (homologues) are reacted with glycerol chlorhydrins, glycol chlorhydrins, alkylene oxides, glycidol, glycerol ether chlorhydrins, glycol ether chlorhydrins, or their appropriate functional derivatives, in the same manner that reactions may take place with phenyl alkylamines, such as benzylamine, as previously described, or as described more fully in our co-pending application for Letters Patent Serial No. 101,436 filed Sept. 18, 1936, then one obtains a salt which is of excellent quality for breaking an oil field emulsion.

It has been previously pointed out that the amine, which may be employed as a raw material, may be indicated by the formula $H_m X_n N$, in which $m$ represents the numeral one or two, $n$ represents the numeral one or two, and $m$ plus $n$ are equal to three and in which X is an alkyl residue, a cyclohexyl residue, a substituted cyclohexyl or an aralkyl residue. Such an amine is reacted with a mono- or di-chlorhydrin derived from glycerol, a glycerol ether, a glycol, a glycol ether, or the appropriate functional derivative which would act in the same manner, such as ethylene oxide, higher alkylene oxides, glycidol, etc. Such product so obtained is used to neutralize the sulfonic acids of the kind hereinafter described.

The chlorhydrins employed are derived from glycerol $C_3H_5(OH)_3$, from glycols, such as $C_2H_4(CH_2)_t(OH)_2$, in which $t$ is zero, one, or more, or from glycerol ethers of the type $$[C_3H_5(OH)_3]_n - (H_2O)_{n-1}$$

in which $n$ is the numeral two or more.

The corresponding glycol ether may be indicated by the formula $$C_2H_4(CH_2)_t(OH)_{2n} - (H_2O)_{n-1}$$

in which $t$ represents zero, one or more, and $n$ is the numeral two or more.

In the present application it is intended to claim a demulsifying process, in which the demulsifying agents are of the kind which include within the generic scope the sub-genuses which are the subject-matter of the various co-pending applications previously mentioned. Such broad genus may be indicated as being derived from an amine by the formula $$[N(X)_b.H_d]_b.[R]_b$$

where X is an alkyl residue, a cyclohexyl residue, or an aralkyl residue; R is a hydroxyl-containing residue derived from a glycerol, glycol, glycerol ether, glycol ether, and their appropriate functional derivatives; $b$ is the numeral one or two; and $d$ is zero or one.

The product so obtained is combined with an alkylated naphthalene sulfonic acid of the kind previously referred to, and of the kind which will be hereinafter described, so as to produce a reagent of the composition $$[N(X)_b.H_d]_b.[R]_b.H.D(SO_3)_m$$

in which the various characters have their previous significance, and $D(SO_3)_m$ is an alkylated naphthalene sulfonic acid residue, in which at least one alkyl group substituted in the naphthalene nucleus contains at least three carbon atoms and not more than ten carbon atoms, and $m$ represents the numeral one, two, or three.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the demulsifying agent contemplated by our process, consists in converting the naphthalene into either the alpha or beta naphthalene sulfonic acid, or a mixture of the same, or in some instances, into a di- or even a tri-sulfonic acid, or a tetrasulfonic acid, or a mixture of the various types. In most instances, there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, a butyl alcohol, an amyl alcohol, a hexyl alcohol, a decyl alcohol, etc., is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the aromatic nucleus, one could also introduce an alkyl residue from some other alcohol, as, for example, an alkylated group derived from ethyl or methyl alcohol, or one might introduce a group derived from an aryl, aralkyl, cyclic or hydroaromatic alcohol.

or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other group present, such as methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lower in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is our preference to produce our reagents from these alcohols, and in some instances, it is desirable to introduce different alkyl groups, such as a propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with a polyhydric alcohol substituted amine derived from various alkylamines, or alkylamines, cyclohexylamine, alkylated cyclohexylamine, etc. in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that we prefer to use in practising our process is obtained by a reaction in which three molecules of isopropyl alcohol are united with one molecule of naphthalene by the customary sulfation, sulfonation and condensation reactions. The resulting mixture consists largely of di-propyl naphthalene sulfonic acids and tri-propyl naphthalene sulfonic acids, with possibly small amounts of mono-propyl sulfonic acids and tetra-propyl sulfonic acids present. Generally speaking, it is easier to conduct the reaction so that the bulk of the sulfonic acid represents the beta type, although the alpha type may be produced, if desired. The product is neutralized with 1-mono-cyclohexyl amino propane-2,3-diol, obtained in the manner previously indicated. The product so obtained is diluted with one or more solvents, so as to reduce its viscosity to that of ordinary caster oil, or slightly greater. The solvents which we preferably employ are a mixture of two or more of the following: Water, denatured alcohol, kerosene, or tar acid oil.

Among the reagents which are particularly effective are the salts formed by reaction between polyhydric alcohol substituted amines derived from various alkylamines, aralkylamines, cyclohexylamines, alkylated cyclohexylamines, etc., and the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl naphthalene sulfonic acids, di-isopropyl mono-amyl naphthalene sulfonic acids, mono-isopropyl mono-hexyl naphthalene sulfonic acids, etc.

It may be desirable to indicate that there is sometimes some variation in nomenclature in regard to the salts derived from strong acids and various amines. For instance, the combination of aniline, and hydrochloric acid, is often referred to as aniline hydrochloride. When aniline hydrochloride is treated with caustic soda, aniline is regenerated and sodium chloride is formed. For this reason, and perhaps for other reasons, structural conditions are best expressed by referring to the compound as a hydrochloride, in order to indicate that one does not obtain the chloride of a quaternary ammonium compound. Similarly, the reaction of a polyhydric alcohol substituted cyclohexylamine with a sulfonic acid may be considered as producing the polyhydric alcohol substituted cyclohexylamine salt, although for reasons pointed out, such salt might be looked upon as a polyhydric alcohol substituted cyclohexylamine hydrogen sulfonate, as well as being considered as a polyhydric alcohol substituted benzylamine sulfonate. Insofar that it is perfectly clear as to the chemical composition of the compound, it is immaterial which nomenclature is employed.

In such instances where there is present more than one sulfonic acid residue, as in the formation of a disulfonic acid, or a tri-sulfonic acid, or a tetra-sulfonic acid, if desired, all the sulfonic acid hydrogen may be neutralized with polyhydric alcohol substituted amine, such as cyclohexylamine, or hydrogen of one sulfonic group may be so neutralized and the other sulfonic hydrogen atom or atoms may be neutralized with some other suitable base, such as sodium hydroxide, potassium hydroxide, ammonium hydroxide, etc.

Polyhydric alcohol substituted amine salts, such as cyclohexylamine salts, in the form of the hydrochloride, may react by double decomposition with alkali sulfonates in a suitable medium to produce the polyhydric alcohol substituted cyclohexylamine sulfonate.

The expressions "polyhydric alcohol", "di-hydric alcohol", "tri-hydric alcohol", etc. are frequently used to indicate materials containing two or more alcoholiform hydroxyls. The expression "di-glycerol" is often used instead of the more complete expression "di-glycerol ether". Similarly, "di-ethylene glycol" is sometimes used instead of the more complete expression "di-ethylene glycol ether". Hereinafter we will use the expression "polyhydric", "di-hydric" or "tri-hydric" alcohol to mean a compound in which there is present the indicated number of alcoholic hydroxyls, but without limitation as to the presence of oxygen in the form of an ether linkage. In other words, it is intended to include the alcohol ethers, as well as the non-etheric alcohols. Thus, the expression "polyhydric alcohol" includes glycerol ether, as well as glycerol itself, and includes di-ethylene glycol ether, as well as ethylene glycol itself. In such instances where reference may be made to substituting a polyhydric alcohol residue free from an ether linkage, that is of the non-etheric type, such materials may be referred to as "triol substituted" or "diol substituted", or as free from an ether linkage. The broad class of materials contemplated for use in neutralizing the alkylated sulfonic acids so as to yield the demulsifying agent contemplated in the present process will be referred to as polyhydric alcohol substituted amines of the kind described, and the substituted amines which are derived from the alcoholic type, as differentiated from the alcoholic ether type, will be referred to as "diol substituted" or "triol substituted" amines, or as being free from an ether linkage.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than polyhydric alcohol substituted amines of the kind contemplated in the present process.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

It is to be noted that the reagents employed in the present process are obtained by neutralizing certain described sulfonic acids with certain substituted amines. The amines are the kind which are obtained by introducing a polyhydric alcohol residue of the kind described in an alkylamine, aralkylamine, or cyclohexylamine or the like. The expression "cyclohexylamine" in its broadest aspect, includes the alkylated cyclohexylamines.

Obviously, any primary or secondary amine exhibiting basic character comparable to benzylamine, cyclohexylamine, mono-amylamine, and the like, would be the manifest chemical equivalent of the materials herein described, and it is intended that such materials so obtained by reaction between such primary or secondary amines and a polyhydric alcohol chlorhydrin or the functional equivalent thereof, as herein described, are to be considered as being the equivalents of substituted alkylamines, aralkylamines or cyclohexylamines, etc., as employed in producing the demulsifying agent of the present process. Considered as being such equivalent amines, for instance, are cycloheptylamine, or hydroaromatic amines, such as are derived by the partial hydrogenation of aniline or its homologues, provided that they are basic to the degree indicated. Materials of this kind are the functional equivalents of alkylamines, aralkylamines, cyclohexylamines, etc. and are so included in proper combination within the scope of the claims. They will react readily with chlorhydrins of the kind described or their equivalents.

Having thus described our invention, what we claim as new and desire to secure by Letters Patent is:

1. A process for breaking petroleum emulsions of the water-in-oil type, which consists in subjecting the emulsion to the action of a demulsifying agent comprising a substituted amine salt of an alkylated naphthalene sulfonic acid, in which at least one alkyl group substituted in the naphthalene nucleus contains at least three carbon atoms and not more than ten carbon atoms; said substituted amine being selected from the class consisting of alkylamines, aralkylamines, cyclohexylamines and their functional equivalents; and said substituent introduced into said amine being derived from a polyhydric alcohol and characterized by the presence of a residual hydroxyl.

2. A process for breaking petroleum emulsions of the water-in-oil type, which consists in subjecting the emulsion to the action of a demulsifying agent comprising a substituted amine salt of an alkylated naphthalene sulfonic acid, in which at least one alkyl group substituted in the naphthalene nucleus contains at least three carbon atoms and not more than ten carbon atoms; said substituted amine being selected from the class consisting of alkylamines, aralkylamines, and cyclohexylamines; and said substituent introduced into said amine being derived from a polyhydric alcohol and characterized by the presence of a residual hydroxyl.

3. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is an alkyl residue, a cyclohexyl residue, or an aralkyl residue; R is a hydroxyl-containing residue derived from a polyhydric alcohol; D(SO₃)m is an alkylated naphthalene sulfonic acid residue in which at least one alkyl group substituted in the napthalene nucleus contains at least three carbon atoms and not more than ten carbon atoms; and b represents the numeral one or two; d represents the numeral zero or one; m represents the numeral one, two or three.

4. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is an alkyl residue; R is a hydroxyl-containing residue derived from a polyhydric alcohol; D(SO₃)m is an alkylated napthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

5. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing residue derived from a polyhydric alcohol; D(SO₃)m is an alklated naphthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

6. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing residue derived from a polyhydric alcohol free from an ether linkage; D(SO₃)m is an alkylated naphthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

7. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing triol residue; D(SO₃)m is an alkylated naphthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

8. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing glycerol residue containing two hydroxyl groups; D(SO₃)m is an alkylated naphthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

9. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing glycol residue; D(SO₃)m is an alkylated naphthalene sulfonic acid residue in which at least one alkyl group substituted in the naphthalene nucleus contains at least three carbon atoms and not more than ten carbon atoms; and b represents the numeral one or two; d represents the numeral zero or one, m represents the numeral one, two or three.

10. A process for breaking petroleum emulsions of the water-in-oil type, which consists in subjecting the emulsion to the action of a demulsifying agent comprising a substituted amine salt of the formula type:

[N(X)ᵦHd]ᵦ.[R]ᵦ.H.D(SO₃)m in which X is a cyclohexyl residue; R is a hydroxyl-containing ethylene glycol residue; D(SO₃)m is an alkylated naphthalene sulfonic acid residue in which at least one alkyl group substituted in the naphthalene nucleus contains at least three carbon atoms and not more than ten carbon atoms; and b represents the numeral one or two; d represents the numeral zero or one; m represents the numeral one, two or three.

11. A process for breaking petroleum emulsions of the water-in-oil type, which consists in subjecting the emulsion to the action of a demulsifying agent comprising a substituted amine salt of the formula type:

[N(X)ᵦHᵈ]ᵦ.[R]ᵦ.H.D(SO₃)ₘ in which X is a cyclohexyl residue; R is a hydroxyl-containing ethylene glycol residue; D(SO₃)ₘ is a propylated naphthalene sulfonic acid residue; b represents the numeral one or two; d represents the numeral zero or one; m represents the numeral one, two or three.

12. A process for breaking petroleum emulsions of the water-in-oil type, which consists in subjecting the emulsion to the action of a demulsifying agent comprising a substituted amine salt of the formula type:

[N(X)ᵦHᵈ]ᵦ.[R]ᵦ.H.D(SO₃)ₘ in which X is a cyclohexyl residue; R is a hydroxyl-containing ethylene glycol residue; D(SO₃)ₘ is a propylated naphthalene monosulfonic acid; b represents the numeral one or two; d represents the numeral zero or one; m represents the numeral one, two or three.

13. A process for breaking petroleum emulsions of the water-in-oil type, which consists in subjecting the emulsion to the action of a demulsifying agent comprising a substituted amine salt of the formula type:

[N(X)ᵦHᵈ]ᵦ.[R]ᵦ.H.D(SO₃)ₘ in which X is a cyclohexyl residue; R is a hydroxyl-containing ethylene glycol residue; D(SO₃)ₘ is a propylated naphthalene monosulfonic acid admixed with a suitable solvent; b represents the numeral one or two; d represents the numeral zero or one; m represents the numeral one, two or three.

14. A process for breaking petroleum emulsions of the water-in-oil type, which consists in subjecting the emulsion to the action of a demulsifying agent obtained by converting naphthalene into the mono-sulfonic acid; converting isopropyl alcohol into the acid sulfate; combining said materials in molecular proportions in presence of sulfuric acid as a condensing agent; followed by the conventional washing process and separation of the aqueous waste acid and neutralization of the sulfonic acid by means of 1-mono-cyclohexyl amino propane-2,3-diol, followed by the addition of a suitable solvent.

MELVIN DE GROOTE.
ARTHUR F. WIRTEL.